(12) United States Patent
Cooper

(10) Patent No.: US 6,513,634 B2
(45) Date of Patent: Feb. 4, 2003

(54) THERMAL DISCONNECT

(75) Inventor: John Cooper, Herts (GB)

(73) Assignee: Goodrich Control Systems Limited, Luton (GB)

(*) Notice: Subject to any disclaimer, the term of this patent is extended or adjusted under 35 U.S.C. 154(b) by 0 days.

(21) Appl. No.: 09/892,934

(22) Filed: Jun. 27, 2001

(65) Prior Publication Data

US 2002/0000354 A1 Jan. 3, 2002

(30) Foreign Application Priority Data

Jun. 30, 2000 (GB) .............................................. 0016178

(51) Int. Cl.[7] ........................... F16D 43/25; F16D 11/14
(52) U.S. Cl. ..................... 192/82 T; 192/69.91; 464/31
(58) Field of Search .............................. 192/82 T, 101, 192/69.9, 69.91; 464/31

(56) References Cited

U.S. PATENT DOCUMENTS

| | | | |
|---|---|---|---|
| 3,212,613 A | * 10/1965 | Carlson | ...................... 192/101 |
| 3,675,444 A | * 7/1972 | Whipple | .................... 464/31 X |
| 3,889,789 A | * 6/1975 | Boehringer | ............... 192/82 T |
| 4,042,088 A | 8/1977 | Schmohe | |
| 4,086,991 A | * 5/1978 | Swadley | .................... 192/82 T |
| 4,271,947 A | * 6/1981 | Gaeckle | .................... 192/82 T |
| 4,934,977 A | * 6/1990 | Falconer et al. | .............. 464/31 |
| 4,989,707 A | 2/1991 | Doty et al. | |
| 5,103,949 A | * 4/1992 | Vanderzyden et al. | .. 192/107 X |

* cited by examiner

Primary Examiner—Richard M. Lorence
(74) Attorney, Agent, or Firm—Reising, Ethington, Barnes, Kisselle, Learman and McCulloch, P.C

(57) ABSTRACT

A drive disconnect device is provided in which input and output shafts are provided in splined engagement. The splines are aligned with the axes of the input and output shafts such that the force acting between the shafts in a separating direction is substantially invariant of the torque being transmitted. The shafts are spring biased to a disengaged position. The biasing force is resisted by a meltable restraining element which is arranged to melt when the temperature exceeds an acceptable value so as to allow the spring to cause the shafts to disengage from one another.

9 Claims, 2 Drawing Sheets

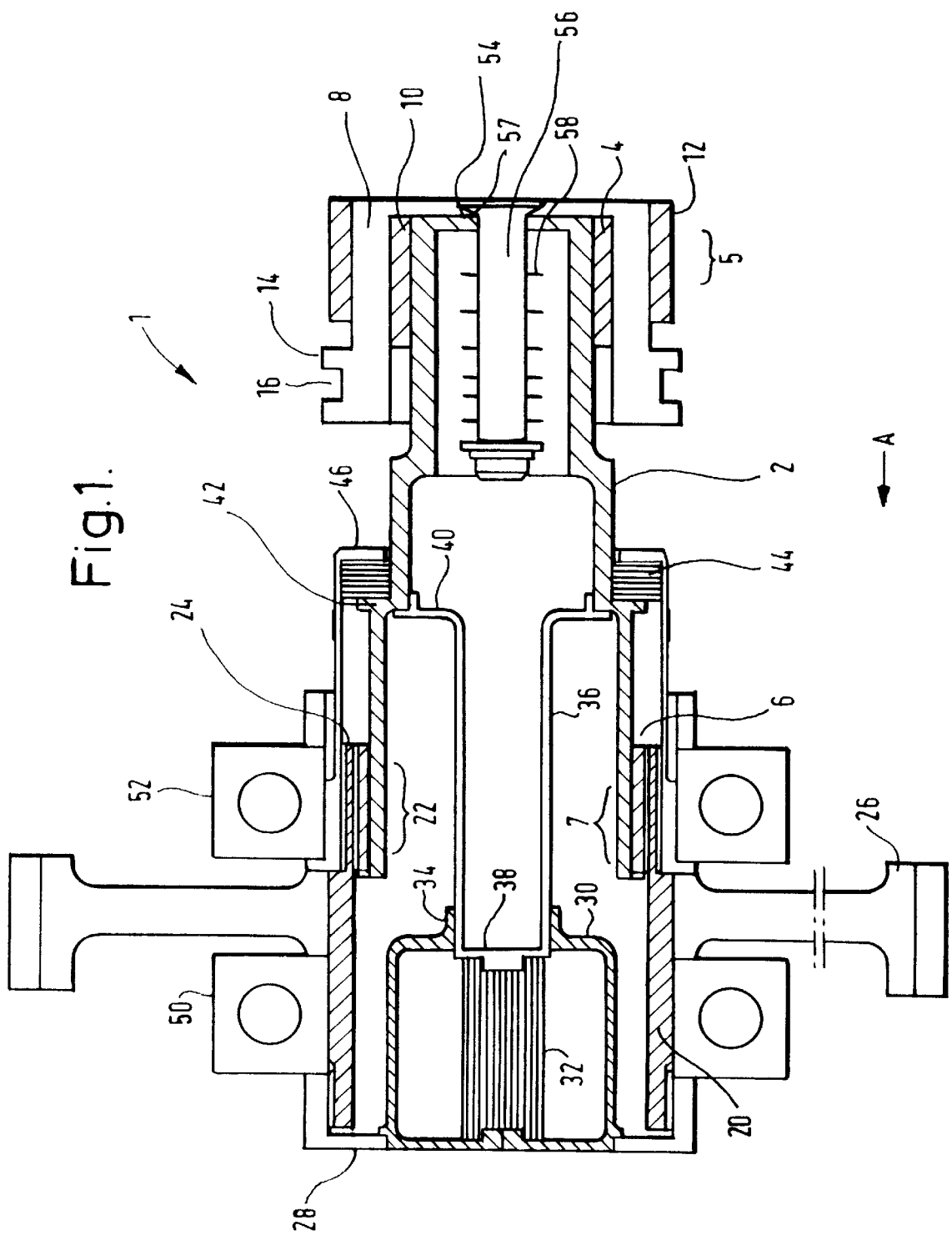

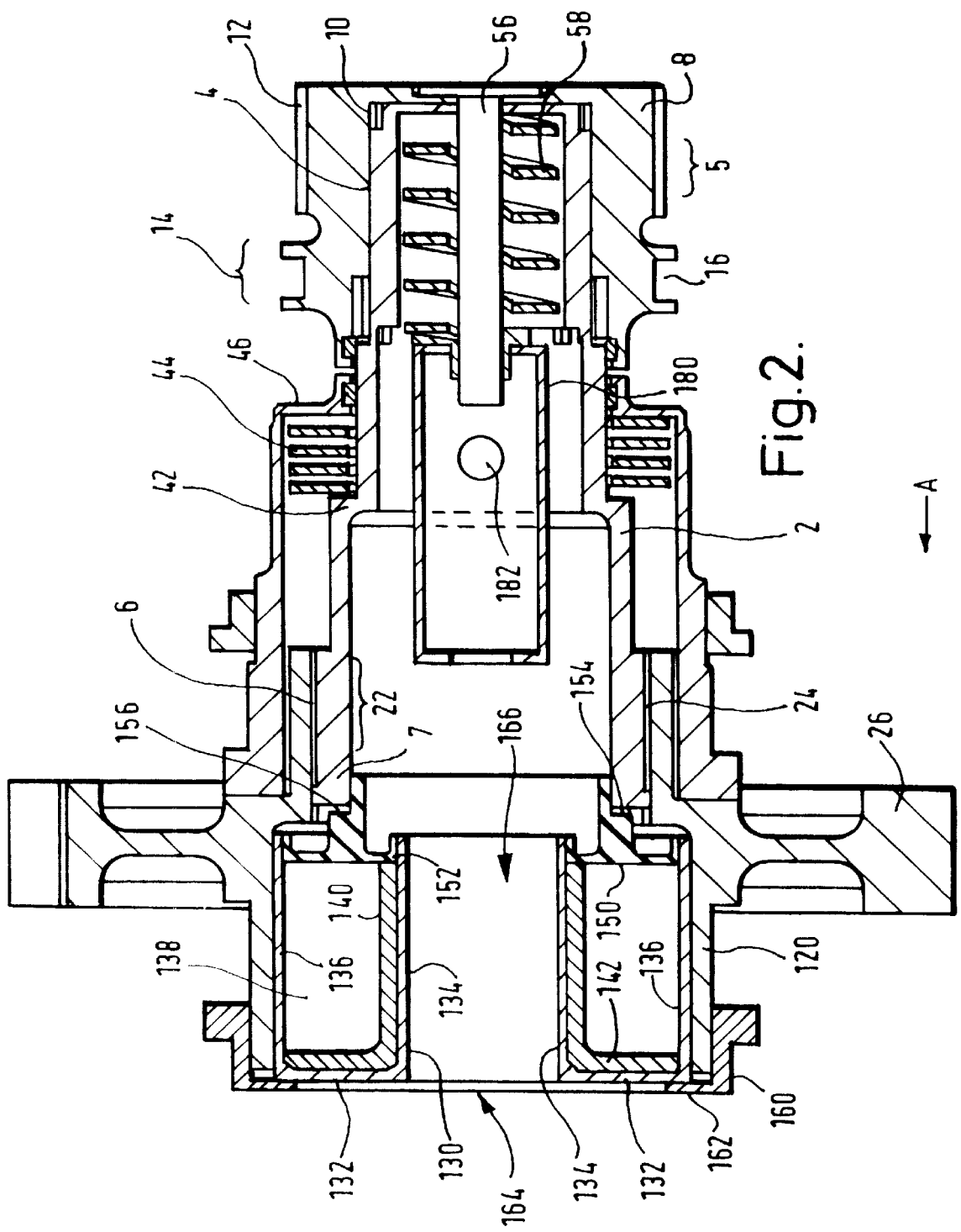

THERMAL DISCONNECT

TECHNICAL FIELD

The present invention relates to a thermal disconnect for removing mechanical connection between a prime mover and a load in response to overheating of the load.

BACKGROUND OF THE INVENTION

It is known to run devices such as generators, constant speed drive mechanisms, and pumps from shafts or spools of prime movers, such as, for example, gas turbine aeronautical engines. Although the load device should be reliable, there is always a possibility that it will experience abnormal operating conditions or will enter a failure mode wherein damage to the load may occur, with the possibility that such damage may result in abnormally high torques being required from the prime mover, possibly to the extent that its integrity will be compromised.

U.S. Pat. No. 5,103,949 discloses a disconnection device in which a drive shaft carries a threaded portion and a plunger is arranged to move in from the side of the drive shaft to engage the threaded portion, thereby causing the screwing action between the plunger and the threaded portion to displace the shaft axially such that it becomes disconnected from a prime mover.

U.S. Pat. No. 4,042,088 similarly has a drive shaft which engages a prime mover via a castellated connection region. The drive shaft also carries a helically threaded portion and a disconnect plunger is arranged to move in from the side of the drive shaft to engage the threaded portion to cause the shaft to move axially so as to disconnect the shaft from the prime mover.

U.S. Pat. No. 4,989,707 discloses a similar arrangement in which a element moves in from the side of a drive interface between input and output shafts in order to engage a threaded portion of a ring in order to cause disconnection between the shafts.

Each of these prior art arrangements suffers from the problem that the shafts will, in general, be rotating rapidly and that the teeth on the control element which moves radially inward to engage the screw thread must engage the thread rapidly before they become damaged or sheared off.

U.S. Pat. No. 4,086,991 discloses a disconnect coupling in which helical splines are used to connect a coupling shaft to a driven member so as to transmit torque to the driven member. The helical splines are carried on an axially movable shaft and are arranged such that the transmission of torque to the driven member acts to urge the coupling shaft and driven member to move to a disengaged position. In normal use, this movement to a disengaged position is inhibited by the provision of a fusible element, such as a eutectic pellet. Such pellets are generally of a soft material and the crushing of the pellet under a compressive load is a well recognised problem, see for example, U.S. Pat. No. 4,271,947 wherein the pellet is manufactured with wire strands therein in order to give it additional mechanical strength. Because of the use of helical splines in U.S. Pat. No. 4,086,991 the crushing force acting on the eutectic pellet varies as a function of the torque transmitted through the disconnect coupling. In particular, the pellet must be able to withstand the crushing load at full torque transfer without suffering deformation. This increase in material in the pellet means that the pellet has an increased mass and thermal capacity, and as such the rate at which the pellet warms is reduced, thereby leading to a potential slowing of the decoupling mechanism. Another problem with the system described in U.S. Pat. No. 4,086,991 is that decoupling between the shaft and the load may not occur when the shaft is lightly loaded. This is significant since the load may be a generator and it is conceivable that the generator itself may not fail, but that the cooling system for the generator might fail, thereby resulting in the need to disconnect the generator in order to prevent damage to it even when the generator is lightly loaded.

U.S. Pat. No. 4,271,947 discloses an arrangement in which two axially aligned shafts engage each other via coaxial gears having teeth extending in the axial direction. A compression spring extends between the gears and urges an axially displaceable one of the gears to move away from the axially fixed gear. A fusible element having strengthening filaments therein acts to resist both the force of the compression spring and the axial forces resulting from torque transfer via the inclined surfaces of the gear teeth.

SUMMARY OF THE INVENTION

According to the present invention there is provided a drive disconnect device comprising:

an input element having a first axis and a first connection region carrying first engagement elements;

an output element having a second axis and a second connection region carrying second engagement elements;

restraint means; and biasing means;

wherein the input element and output element can undergo relative axial displacement with respect to one another between a coupled position where the first engagement elements cooperate with the second engagement elements such that the input element is drivingly connected to the output element, and a decoupled position where the first and second engagement elements are disengaged from one another, the biaising means acts to urge the input and output elements towards the decoupled position and the restraint means serves to resist the urging of the biaising means until the temperature of the restraint means exceeds a predetermined value, and wherein the engagement elements extend only axially along at least one of the input and output elements.

It is thus possible to ensure that the contacting surfaces which serve to transmit load between the input element and the output element engage each other on a surface with which the first axis or the second axis is parallel.

It is thus possible to ensure that the force acting on the restraint means does not vary as a function of the torque being transmitted by the drive disconnect coupling.

Preferably the first and second engagement elements are splines. The first engagement elements may extend radially outward from the input element and the second engagement elements may extend radially inward from the output element. The input element is preferably radially smaller than the output element such that it can be partially disposed within the output element and movable axially with respect to the output element.

Preferably the input element carries a third engagement region for releasably engaging with a drive shaft of a prime mover, or with a coupling element connected to a drive shaft.

Preferably the coupling element acts to inhibit lubricant loss from around the drive shaft when the drive disconnect device is in its disconnected state.

Preferably the third engagement region cooperates with a fourth engagement region carried in the coupling element such that the input element is drivingly connected to the coupling element when the input element is coupled to the output element.

Advantageously the third and fourth engagement regions disengage from one another when the input element decouples from the output element. A further biaising device may be provided to urge the input element to drivingly disconnect from the coupling element.

Preferably the biasing means comprises at least one spring. The or each spring may be a wave spring, and where multiple wave springs are provided these may be stacked in a crest to crest fashion. This is the advantage of providing a spring configuration which when in its compressed state takes up a relatively small amount of space in the axial direction, but which can give a relatively high degree of expansion.

Advantageously the restraint means is formed from a material, such as a eutectic mixture or solder whose melting temperature is well controlled. The material is selected such that it will melt at a temperature that will be attained by the lubricant if the device driven by the coupling fails or overheats. Preferably a pellet or column of the eutectic material is formed and is positioned such that it either directly or indirectly bears the load provided by the biasing means. Advantageously the eutectic is placed within a substantially sealed container such that, as it melts, it is restrained from coming into contact with lubricants used in the vicinity of the drive disconnect device.

In a preferred embodiment, the eutectic mixture is provided in the form of a cylinder (ie a hollow column). The cylinder of eutectic material is advantageously in contact with a container. The container may, for example have the profile of a disk having two upstanding walls disposed at different radii from the centre of the disk. The container may itself then be positioned such that the base and/or walls thereof are directly bathed in lubricant or in good thermal contact with components that themselves are bathed in lubricant, such as oil. This arrangement helps to ensure good heat transfer between the lubricant and the eutectic restraint means. This is advantageous to ensure rapid operation of the disconnect mechanism.

Thus the individual elements of profiling the connection between the input and output elements so as to remove axial force acting on the eutectic (thereby allowing less eutectic to be used to obtain the necessary physical strength) and the good thermal contact between the eutectic and the lubricant each give significant operational advantages and together provide a thermal disconnect mechanism having significantly reduced disconnect period, ie it disconnects much more quickly because the heat from the lubricant is transferred more quickly to the eutectic.

BRIEF DESCRIPTION OF THE DRAWINGS

The present invention will further be described by way of example with reference to the accompanying drawings, in which:

FIG. 1 is a cross-section through a drive disconnect device constituting a first embodiment of the present invention; and FIG. 2 is a cross-section through a drive disconnect device constituting a second embodiment of the present invention.

DETAILED DESCRIPTION

The thermal drive disconnect device shown in FIG. 1 and generally indicated 1, comprises a circularly symmetric input shaft 2 carrying a first set of splines 4 at a first end 5 thereof, and a second set of splines 6 at a second end 7 thereof. The first end of the shaft is, in use, in driven engagement with a generally cup shaped coupling element 8 which has radially inward facing splines 10 to engage with the splines 4 and also radially outward facing splines 12 for engaging with a drive element (not shown) forming part of or driven from a prime mover. The coupling element 8 has a region 14 of increased diameter which carries a radial recess 16 for accepting an oil seal such that the coupling element may be attached in fluid sealed rotary engagement with a housing (not shown) constituting part of the prime mover or a device driven therefrom. The purpose of the coupling element is to ensure that a lubricant for the prime mover is not lost from the prime mover when the drive disconnect device moves to a disconnected state.

The second end 7 of the input shaft extends partially within a cylindrical output element 20 which has a portion 22 carrying radially inward facing splines 24 which normally engage with the splines 6. The output element 20 carries and is drivingly connected to an output gear 26 which, in use, engages with other gears (not shown). The output gear 26 is an integrally formed part of a generally cup shaped carrier which engages with the output element 20 via splines and which has an end wall portion 28 which extends radially inwards and acts to form a support for a cylindrical chamber 30 which contains a fusible compression element 32. The element 32 is made from a eutectic mixture, similar to a solder, such that its melting point can be accurately controlled. The container 30 has an open mouth 34. An elongate cylindrical element 36 extends through the mouth 34 and has an end portion 38 which abuts the fusible element 32. The cylindrical element 36 has a flange 40 formed at its end nearest the coupling element 8, which flange abuts against a first face of a shoulder 42 formed in the input element 2. The shoulder 42 defines two faces. A second face, which faces towards the coupling 8 acts as an abutment surface for a compression spring, or plurality of compression springs 44 which extend between the shoulder 42 and an end wall 46 which is part of or rotates with the output element 20. The compression springs 44 act on the input element 42 to urge it away from the position shown in the accompanying figure, and to move along the direction of arrow A such that the splines 6 and the splines 24 disengage from one another thereby decoupling the drive from the shaft 2 to the output element 20.

The gear 26 and its supporting structure is rotatably held with respect to a fixed supporting structure (not shown) by bearings 50 and 52.

The first end of the input element 2 has a centrally positioned hole 54 through which a rod 56 extends. The rod 56 cooperates with the spring 58 whose ends are secured to the rod 56 and end wall of the element 2, respectively, such that spring 58 is held under tension when it is at the configuration shown in FIG. 1. As shown in the accompanying figure, the rod 56 has an enlarged head which engages with the coupling element 8 via a conical face. This arrangement means that the thermal disconnect device and coupling element 8 can be formed as an integral unit allowing service personnel to replace them as a single unit.

In use, the disconnect device is normally in the configuration shown in FIG. 1. Thus drive from a prime mover (not shown) is transmitted via the coupling element 8 and it's splines to the input element 2 and from the input element 2 to the output element 20 via the splines 6 and 24. This causes the gear 26 to rotate which then transmits the drive to other elements downstream of the disconnect device. The disconnect device is normally housed in the same casing as the load device and shares its lubricating medium.

If the load enters a failure mode, it is well recognised that the friction resulting from the failure will rapidly warm the lubricant. Since the device 1 is in intimate contact with the lubricant (it will normally be sprayed with oil during use) then any increase in the lubricant temperature is rapidly transmitted to the disconnect device. Once the lubricant temperature exceeds the thermal cut-out value, the heat within the lubricant causes the fusible element 32 to melt. The molten eutectic mixture is thrown towards the side walls of the chamber 30 due to centrifuigal force, since the output element 20 and casing 30 are undergoing rotary motion. The melting of the fusible element 32 means that it is no longer in a position to provide a force, transmitted via element 36 and flange 40, to oppose the bias force exerted by the spring 44. Thus, under the urging of spring 44 the input element moves along the direction indicated by arrow A. The amount of travel is selected such that the splines 6 and 24 become uncoupled thereby disengaging the input element from driving connection with the output element 20. During this movement, the element 36 is also driven along the direction of arrow A, such that its end section 38 moves into the chamber 30. Given that the torque transmitted through the disconnect coupling may be quite large, the spring 44 has to have sufficient strength in order to overcome the frictional engagement between the splines 6 and 24. Once the splines have become decoupled, the torque acting between the coupling element 8 and the input shaft 2 becomes much reduced. However, it is advantageous that this drive connection should also be uncoupled. The relative length of the splines 6 and 4 could be selected such that spring 44 will always cause both driving connections to become uncoupled as it expands. However, it is advantageous to include the spring 54 in combination with the rod 56 which acts to ensure that the connection between splines 4 and 10 also becomes uncoupled. It should also be noted that the device must disconnect when the drive torques are low. This condition may arise when a generator has turned off. This would normally be expected to reduce the temperature within the housing. However, if, for example, the cooling system for the generator has failed then the temperature may continue to rise thereby triggering the disconnect even under low load conditions.

It is worthwhile noting that a technician can tell if the disconnect has operated by attempting to turn the coupling element 8 by hand. In general he will be able to turn it if the disconnect has operated, but not be able to turn it if the disconnect device has not operated.

It is thus possible to provide a thermal decoupling device wherein the use of axially aligned splines means that the force borne by the fusible element 32 becomes that derived solely from the springs 44 and is not increased as a result of the torque being transmitted through the coupling device. This means that the size of the fusible element 32 can be more accurately selected, since its crushing load is determined by the spring 44, and thus a more rapid and reliable disconnect can be achieved compared with the prior art arrangements using helical splines or dog teeth where the transmission of torque necessarily induces a further crushing load. Furthermore, the compression spring no longer has to be strong enough to overcome the separating loads generated by the use of helical splines or dog teeth and consequently the forces acting within the disconnect element become reduced and the operation of the device becomes more predictable and reliable.

FIG. 2 schematically illustrates a second embodiment of a thermal disconnect. Parts of this embodiment which are similar to or identical with those described hereinbefore with reference to FIG. 1 are indicated by the same reference numbers. The device shown in FIG. 2 differs from that shown in FIG. 1 primarily by the way in which the eutectic element is held. In this arrangement the chamber 30 is replaced by a modified chamber 130 which is circularly symmetric and which comprises an end wall 132, a first cylindrical wall 134 extending from the end wall 132 into the body of the disconnector device, and a second cylindrical wall 136 having a greater radius than the first wall 134, also extending from the end wall 132 into the body of the thermal disconnect device. Thus the container 130 defines a circularly symmetric U-shaped channel 138. A eutectic element 140, in the form of a cylindrical wall and optionally having a disk shaped end portion 142 is disposed within the U-shaped channel 138 so as to be in intimate contact with the walls 132 and 134.

An annular piston 150 is positioned such that a first portion 152 thereof bears against the end face of the eutectic cylinder 140 which faces into the disconnect element, whereas a second portion of the annular piston 150 defines an annular shoulder 154 which bears against a co-operating shoulder of the input element 2 via an intermediate elastomeric washer 156 so as to prevent fretting. Thus, the compressive load exerted by the springs 44 is transmitted to the input element via the shoulder 42 and from the input element it is transmitted to the eutectic 140 via the annular shoulder 154, the co-operating shoulder on the input element 2, the elastomeric element 156 and portion 152 of the piston 150. This, in turn, causes the eutectic 140 to bear against the end wall 132 of the container 130. The container 130 is constructed such that it can withstand the compressive forces without deformation.

A modified end cap 160 is provided which forms an annular end portion 162 against which part of the end wall 132 is able to bear against in use, thereby holding the container 130 in its correct position. The end cap 160 thereby also defines a circular orifice, generally indicated 164 which leads into a cylindrical chamber, generally indicated 166 defined by the walls 134 of the container 130. Thus lubricant within the machine incorporating the thermal disconnect element can wash over the internal wall 134, thereby rapidly transferring heat to the eutectic mixture 140. Thus the eutectic restraining element 140 is in excellent thermal contact with the lubricant. Any warming of the lubricant due to a failure within the device is rapidly transferred to the eutectic element 140, and if the lubricant temperature exceeds the eutectic melt temperature, the element 140 melts. This, as before, removes the force opposing expansion of the spring 44, thereby allowing the input element 2 to move out of driving connection with the output element 120. In the arrangement shown in FIG. 2, the output element 120 differs from the corresponding element shown in FIG. 1 in that the output gear 26 is formed as an integral part thereof. A further modification to the arrangement shown in FIG. 2 relates to the connection of the pin 56. As shown in FIG. 1, the spring 58 extends between a nut and an end wall of the element 2. In the new embodiment the nut is replaced by a frame 180 which is rigidly secured to the rod 56. The frame 180 defines a wall having an aperture therein. A locking pin 182 extends through the apertures to hold the frame in position with respect to the input element 2.

It is thus possible to provide a further drive disconnect device whose operation is similar to that of the first drive disconnect device described herein, but which allows lubricant to be in intimate contact with the eutectic restraint means via a relatively thin intermediate wall 134.

What is claimed is:

1. A drive disconnect device, comprising:

an input element having a first axis and a first connection region carrying first engagement elements;

an output element having a second axis and a second connection region carrying second engagement elements;

a restraint device; and a biasing arrangement;

wherein the input element and output element can undergo relative axial displacement with respect to one another between a coupled position where the first engagement elements cooperate with the se engagement elements such that the input element is drivingly connected to the output element, and a decoupled position where the first and second engagement elements are disengaged from one another, the biasing arrangement acts to urge the input and output elements towards the decoupled position and the restraint device serves to resist the urging of the biasing arrangement until the temperature of the restraint device exceeds a predetermined value, and wherein contacting surfaces of the engagement elements which serve to transmit load between the input element and the output element extend parallel with the axis of the input and output elements.

2. A drive disconnect device as claimed in claim 1, in which the first and second engagement elements are splines.

3. A drive disconnect device as claimed in claim 1, in which the first engagement elements extend radially outward from the input element and the second engagement elements extend radially inwardly from the output element.

4. A drive disconnect device as claimed in claim 1, in which the input element carries a third engagement region for releasably engaging with a drive shaft of a prime mover.

5. A drive disconnect device as claimed in claim 4, in which the third engagement region is connected to the drive shaft via coupling element which has a fourth engagement region which drivingly couples with the third engagement region when the input element is coupled to the output element, and the third and fourth engagement regions disengage from one another when the input element decouples from the output element.

6. A drive disconnect device as claimed in claim 1, in which the restraint device is formed of a material whose melting temperature is well controlled.

7. A drive disconnect device as claimed in claim 1, in which the restraint device is positioned such that it is within a substantially sealed container such that it is restrained from coming into contact with a lubricant used in the vicinity of the drive disconnect device.

8. A drive disconnect device as claimed in claim 7, in which the restraining means is in contact with a first side of a wall of the container, a second side of the said wall being in contact with the lubricant.

9. A drive disconnect device, comprising:

an input element having a first axis and a fist connection region carrying first engagement elements an output element having a second axis and a second connection region carrying second engagement elements;

a restraint device; and a biasing arrangement;

wherein the input element and output element can undergo relative axial displacement with respect To one another between a coupled position where the first engagement elements cooperate with the second engagement elements such that the input element is drivingly connected to the output element, and a decoupled position where the first and second engagement elements are disengaged from one another, the biasing arrangement acts to urge the input and output elements toward the decoupled position and the restraint device serves to resist the urging of the biasing arrangement until the temperature of the restraint device exceeds a predetermined value, and wherein the engagement elements are axially extending splines.

* * * * *

UNITED STATES PATENT AND TRADEMARK OFFICE
CERTIFICATE OF CORRECTION

PATENT NO. : 6,513,634 B2
DATED : February 4, 2003
INVENTOR(S) : John Cooper

It is certified that error appears in the above-identified patent and that said Letters Patent is hereby corrected as shown below:

Column 5,
Line 31, after "splines 6 and" delete "4" and insert therein -- 24 --

Column 7,
Line 14, after "cooperate with the " delete "se" and insert therein -- second --

Signed and Sealed this

Eighth Day of July, 2003

JAMES E. ROGAN
*Director of the United States Patent and Trademark Office*